INVENTOR.
ALBERT J. HANSSEN
BY David McKenney
ATTORNEY

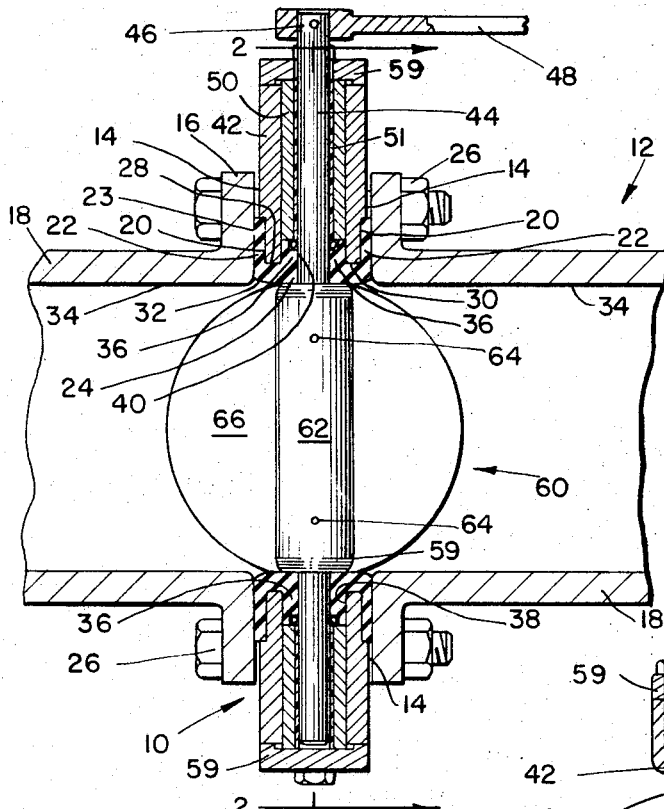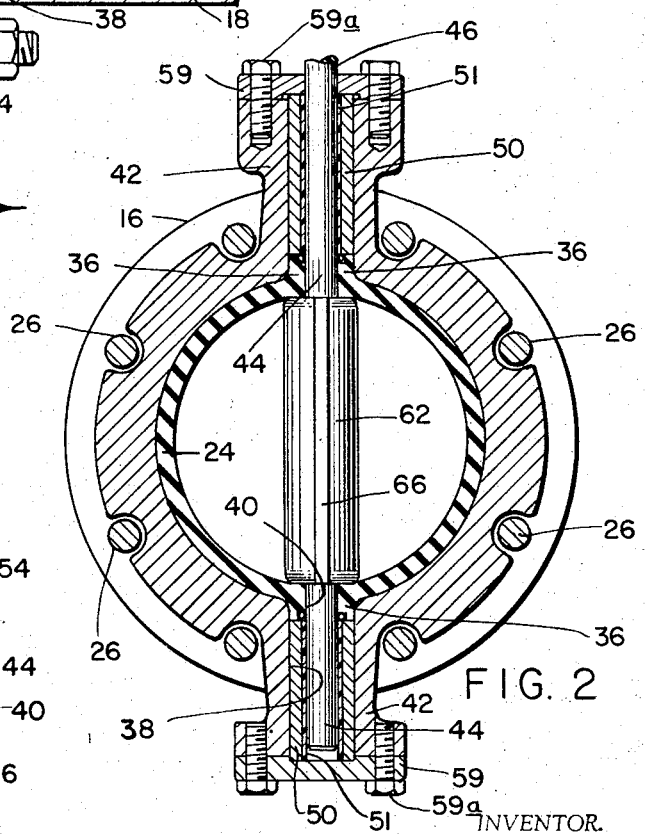

INVENTOR.
ALBERT J. HANSSEN
ATTORNEY

Oct. 10, 1967 A. J. HANSSEN 3,346,005
LINED BUTTERFLY VALVES
Filed Oct. 29, 1964 4 Sheets-Sheet 4

INVENTOR.
ALBERT J. HANSSEN
BY
ATTORNEY

3,346,005
LINED BUTTERFLY VALVES

Albert J. Hanssen, Glenside Gardens, Pa., assignor to Conoflow Corporation, Philadelphia, Pa., a corporation of Pennsylvania
Filed Oct. 29, 1964, Ser. No. 407,296
14 Claims. (Cl. 137—375)

This invention relates to improvements in lined butterfly valves. More particularly it has to do with improved configurations of the disc and liner in the region where the stem extends from the disc.

While butterfly valves are made with many variations determined by the services in which they will ultimately be used, they have certain common features which will be described briefly here for a better understanding of this particular invention. One such common feature is a body casing having a generally cylindrical flow passage therethrough with a longitudinal axis and having a pair of aligned stem journal openings on opposite sides of said flow passage at a substantial angle to such axis. Extending stem portions are rotatably received in said openings and at least one such portion projects from the body exterior for connection to a hand lever or power actuator. Another common feature is a flat disc carried between the above-mentioned stem portions, located in the passage and of such size and shape that when rotated to "closed" position the edges of the disc engage, or at least lie close to, the passage walls around the entire disc periphery. The disc is also of such size and shape that when rotated to "open" position, the plane of the disc lies generally parallel to the passage axis.

As a result of these features, the flow through the passage in the open position is interfered with only by the thickness of the disc which is presented edgewise to such flow. The flow through the valve in the closed position is efficiently blocked by the close fit between the disc edges and pass walls.

Where completely tight-shut-off is not required it is possible to make both the disc edge and the seat on the passage wall of metal or other relatively non-resilient material. In such a case, a satisfactory closure is obtained by swinging the disc's edge into actual contact with the seat or merely into close proximity therewith. For many applications, however, a completely tight shut-off is required, and as a result there are a number of butterfly valve designs where either one of the disc edge or the wall seat is provided with a relatively resilient seating material which, on closure, engages the relatively harder material of the other and is deformed thereby to provide a fluid-tight seal. In addition, there are applications where it is desirable to have valve passage walls which are relatively inert in the presence of corrosive fluids. Body materials which are both relatively inert and rigid enough to give the required strength (for example stainless steel) are usually expensive, and accordingly, the use of relatively inert liners is popular because it enables the employment of inexpensive and easily formed rigid body materials, such as cast iron, which, if unprotected, would be readily attacked by corrosive fluids. The liners prevent the fluid being handled from coming in contact with these body materials. It is often a fortunate coincidence that these relatively inert liner materials are sufficiently resilient to provide tight shut-off, and one of the most popular designs for these inert-resilient liner applications is that in which the entire body passage wall is lined with a single liner piece, having such dimensions relative to the disc that it is compressed somewhat by the edge of the disc when the disc has been rotated to closed position.

However, a serious difficulty with the previously proposed single-piece liner designs has been the failure to achieve, in a mass produced valve, a proper seal between the disc edge and the liner surface in that seating region where the stem portions extend from the disc and into the journal openings for these portions. This difficulty arises from the fact that in this seating region the rotation of the disc to close position does not cause the edge of the disc to move very much closer to the liner than it was in open position, and accordingly, a substantial permanent compression of the disc edge against the liner must be maintained in this region even in the open position. The transition from this permanent liner compression to the compression which occurs only on closure has been very difficult to achieve in the past.

This difficulty has been complicated by the fact that butterfly valve discs have thickened hub portions at the junctures of the disc and stem portions for the purpose of providing an outwardly presented (with respect to the flow passage) annular surface. This annular surface is necessary to provide a continuous sealing strip from the narrow disc edge on one side of the stem portion to the narrow disc edge on the other side of the stem portion. Merely having the disc terminate at the right angle junction with the stem portion on one side thereof and then begin again at another right angle junction on the other side has not been successful because the liner material cannot be maintained in sealing contact with the disc edge and stem surface in such sharp corners.

Theoretically, the ideal annular disc hub surface follows the surface of an imaginary sphere having the diameter of the disc edge, and prior art valves have been proposed with this construction. It is an ideal construction in the sense that the desired permanent compression of the resilient liner on the annular surface turns out to be exactly the same as the compression produced by closure on the disc edge, so that the permanent and closure compression blend together in a smooth transition. By merely making the disc edge diameter large enough for slight interference with the liner (and squeeze thereof) the same amount of interference (squeeze) occurs at the hub annular portion as a permanent compression and along the remainder of the disc edge as a closing compression, and the transition from permanent compression to closing compression is completely smooth and free of corners or creases in the liner or shoulders or ridges on the disc.

The principal difficulty with this "ideal" spherical construction is the relatively high cost involved in its manufacture, it being generally true that mass production of such extensive spherical surfaces to the close tolerances required here is prohibitively expensive. Another difficulty arises from the necessity, in this "ideal" construction, to chamfer the junctions of the disc edges and the disc sides. Thus, despite the fact that the disc edge is a portion of spherical surface, the radius of the sphere is so large that relatively sharp corners occur at the above-mentioned junctions, and local chamfering of these corners is necessary. This is expensive because such chamfering is difficult to do automatically.

In general, the present invention overcomes these difficulties by providing an annular disc hub surface of novel configuration, and by providing a novel cooperating liner surface configuration by proportioning these disc and liner surfaces in a particularly advantageous way with respect to each other and by providing a novel disc edge chamfer.

Thus, for example, I have discovered that the annular disc surface can be located inside and cutting across the above-mentioned imaginary sphere, and that despite the corners or shoulders that such an annular disc surface forms with the disc edge, a surprisingly satisfactory seal is achieved across the annular disc surface, at the shoulders and along the curved disc edge.

Preferably this annular disc hub surface is a surface of a revolution about the stem axis, and by far the best results have been achieved where this novel surface of revolution is in a flat plane perpendicular to and intersecting the stem axis at a point substantially within the sphere. As a practical matter, an unmachined metal disc casting can have such flat surface provided by a milling operation which, as persons in this art will understand, is much less expensive than a lathe operation in which the cutting tool must produce an extensive spherical surface.

I have also discovered that when the annular disc hub surface is spaced interiorly with respect to and cuts across the ideal spherical a well-rounded disc edge chamfer can be automatically machined at the intersection of the disc edge and the disc sides, providing that a substantial portion of the annular surface is closer to the sphere center than any part of the chamfered surface. With such proportions the rough disc casting can be chucked in a lathe for rotation about an axis passing through the sphere center and perpendicular to the disc plane, and the disc edge circle with a substantial chamfer extending inwardly therefrom can be machined in a single operation which, although a lathe operation, is much easier and less expensive than the lathe operation for achieving a spherical surface. The proportions can be arranged so that the tool for accomplishing this chamfer does not cut into the disc hub at all. In any event it does not cut into the hub enough to break the continuity of the annular surface thereon, because at least a large part of this annular surface is well inside the machining circle for both the disc edge circle and the portions of the chamfering tool which extend inwardly from this edge circle.

In addition, I have discovered that in conjunction with my easy machining of the disc hub annular surface and chamfered disc edge, the leakage which might be expected to take place at the disc shoulders is prevented by providing the liner with a corresponding annular hub surface that extends outwardly (with respect to the stem axis) slightly farther than these shoulders. With this construction the corner or crease formed by the junction of the liner's annular hub surface and cylindrical wall is engaged, when the valve is closed, by the relatively narrow and extensively chamfered disc edge rather than by the relatively wide and flat (or certainly less curved) disc annular hub surface, and there is therefore less opportunity for leakage. The narrow, chamfered disc edge penetrates more successfully into the soft liner material at the liner corner than the wide disc annular hub surface would, and therefor achieves a better seal at these points.

It has been discovered that with such an arrangement of parts the seal afforded by the permanent compression of the liner material in the boss (achieved through suitable dimensions of body, liner and disc) and the seal afforded by the closure compression of the liner material in the cylindrical flow passage (achieved through rotation of the disc to closed position) blend together without leaks. This is a surprising and unexpected result for such an arrangement, because the seal is achieved with somewhat different amounts of liner compression at the flattened and curved regions and because the seal is achieved with mismatched disc shoulders and liner surface corners.

In view of the foregoing, it is one object of the present invention to provide a lined butterfly valve in which the disc has edge portions following the curve of imaginary spherical plane, in which the disc has an annular surface portion around the stem axis about which the disc rotates, and in which this annular surface is located within and cuts across the spherical plane.

Another object is to provide a lined butterfly valve of the kind described in which the annular surface is a surface of revolution around the stem axis.

Another object is to provide a lined butterfly valve of the kind described in which the annular surface lies in a flat plane perpendicular to the stem axis.

Another object is to provide a lined butterfly valve in which there is a novel relationship between the disc edge and the liner seating surface in the general region of the axis about which the disc rotates.

Another object is to provide a lined butterfly valve of the kind described in which the liner seating surface also has an annular portion around the stem axis and in which this portion extends from this axis at least as far as the annular disc surface portion.

Another object is to provide a butterfly valve of the kind described in which the annular disc surface forms shoulders with the curved disc edge portions, in which the annular liner surface forms corners with the curved liner walls, and in which the disc shoulders are located inwardly of the liner corners with respect to rotational axis of the disc when the disc is in closed position.

Another object is to provide a butterfly valve of the kind described in which the annular disc surface lies in a flat plane which is perpendicular to the axis of the disc rotation and extends from this axis to the disc shoulders the same distance as the corresponding annular liner surface extends from this axis to the liner corners.

Another object is to provide a butterfly valve of the kind described in which the flattened annular disc surface has a main portion formed on the end of a disc hub, in which a pair of disc wings extend from opposite sides of this hub, in which the curved disc edge portions are located on these disc wings and in which the flattened annular disc surface has additional portions which are short and narrow and which extend outwardly along said wings.

Another object is to provide a butterfly valve of the kind described wherein the main portion of the flattened annular disc surface lies inside a circle which is defined by the innermost part of the chamfer on curved disc edge portions.

Another object is to provide an improved lined butterfly valve which is relatively inexpensive to manufacture and easy to operate and maintain and which is particularly leak-tight in closed position.

Other objects will appear hereinafter.

The best modes of practicing the present invention are shown in the accompanying drawings, but these are to be deemed primarily illustrative for it is intended that the patent shall cover suitable expression in the appended claims whatever of patentable novelty exists in the invention disclosed.

In the drawings:

FIGURE 1 is a cross-section side elevation view of a lined butterfly valve according to the present invention, the valve being mounted in a pipe line and shown in the open position.

FIGURE 2 is a cross-sectioned end elevation view of the valve of FIGURE 1, taken on line 2—2 of FIGURE 1.

FIGURE 2A is an enlarged fragmentary cross-sectioned view of the stem seal shown in FIGURE 2.

Figure 3:
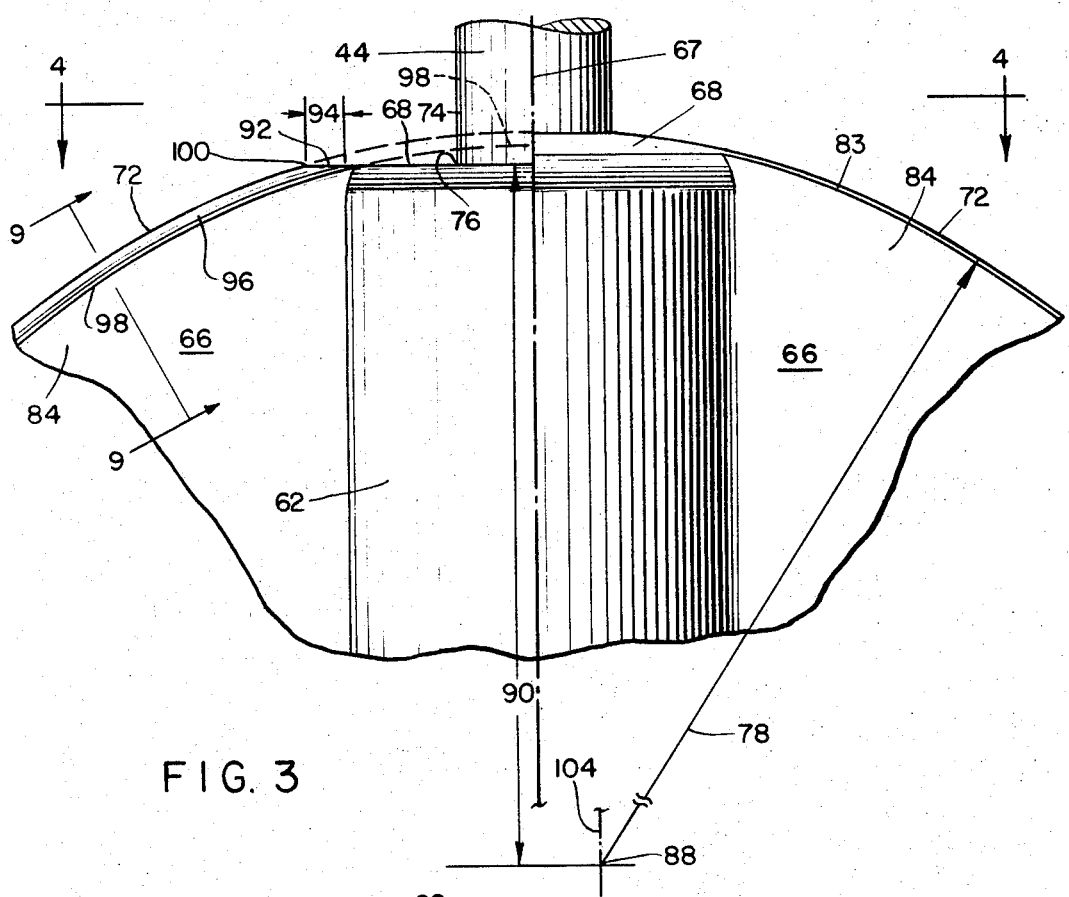
FIGURE 3 is an enlarged fragmentary side elevation view of a butterfly valve disc, showing on the left hand side of the centerline an embodiment of the invention and on the right hand side of the centerline for comparison, a theoretical construction.

Referring now more particularly to the drawings, FIGURE 1 is a cross-sectioned side elevation view of a butterfly valve according to the present invention. This valve has a rigid body 10, preferably a metal casting machined to some extent, and essentially in the form of a flat-sided ring with an internal diameter somewhat greater than the diameter of the pipe line 12 in which the valve is intended to be installed. The flat sides 14 of this body ring are parallel to each other for registration with flanges 16 on the pipe sections 18 which make up the pipe line and they have recessed portions 20 to accommodate radially extending liner flanges 22. These flanges are located on a rubber or rubber-like liner 24 and are thick enough to extend longitudinally beyond the planes of the remaining unrecessed portions of the body sides. In this way the pipe flanges 16, when drawn toward the body ring sides, engage only the liner flange surfaces 23. This drawing action is achieved by bolt and nut assemblies 26 which extend across the body ring 10 and through the pipe flanges 16.

Between the flanges 22 and the liner 24 is in the general form of a cylinder having an outside surface 28 adapted to fit the inside surface 30 of the ring body 10 and having an inside surface 32 coinciding more or less with the inside surfaces 34 of the pipe sections.

Extending radially from the opposite sides of its outside surface 28 the liner has aligned hubs 36 which fit into corresponding passageways 38 in the body ring and which are provided with aligned radial openings 40. The passageways 38 continue through the body ring to the exterior thereof which, at each of these locations, is on a radial extension 42. These extensions provide longer journals for the valve stem 44, which is located in the openings 40 and passageways 38, than would result merely from the normal radial thickness of the ring. The stem in this embodiment is a separate shaft which extends entirely across the valve and projects slightly at 46 from one body ring extension 42 to receive thereon a handle 48 which is pinned thereto and which provides easy rotation of the stem. Metal sleeves 50 are located in the outer ends of body ring passageways 38 and surround plastic bushings 51 which provide journals for facilitating stem rotation, and the liner hub openings 40, through which the stem also passes, have bonded therein metal retainers 54 for O-ring seals 56 preventing leakage of fluid out of the valve along the stem.

FIGURE 2A shows that each such retainer 54 is essentially a ring which is embedded in the resilient liner material, for example, by being molded in when the liner is made, and which is provided with an internal groove 58 large enough to accommodate an O-ring 56 in the usual sealing relationship between the walls of the groove and the stem shaft. As shown, each retainer is adjacent the end of the hub 36, but it will be understood that it can be located anywhere along the opening 40.

The sleeves 50 are held in place by plates 59 secured to the ends of extensions 42 by bolts 59a. The upper plate is apertured to accommodate stem projection 46.

The flow passageway for the controlled fluid is defined by the inside liner surface 32, and a disc 60 is mounted on the stem portion which extends across this passageway. This disc is generally circular and flattened so that when in the position of FIG. 1 the flow passageway is obstructed only by its thickness, and when rotated 90° from that position the flow passageway is completely blocked.

The maximum disc thickness is dictated by a central hub 62 which has an opening therethrough to receive the stem and which must have an outside diameter greater than this opening by the amount of the required hub wall thickness. The disc is prevented from turning on the stem by pins 64 through the stem and through hub walls.

The remainder of the disc need not be as thick as the disc hub and preferably takes the form of a pair of flat wings 66 extending from opposite sides of the hub.

Figure 4:
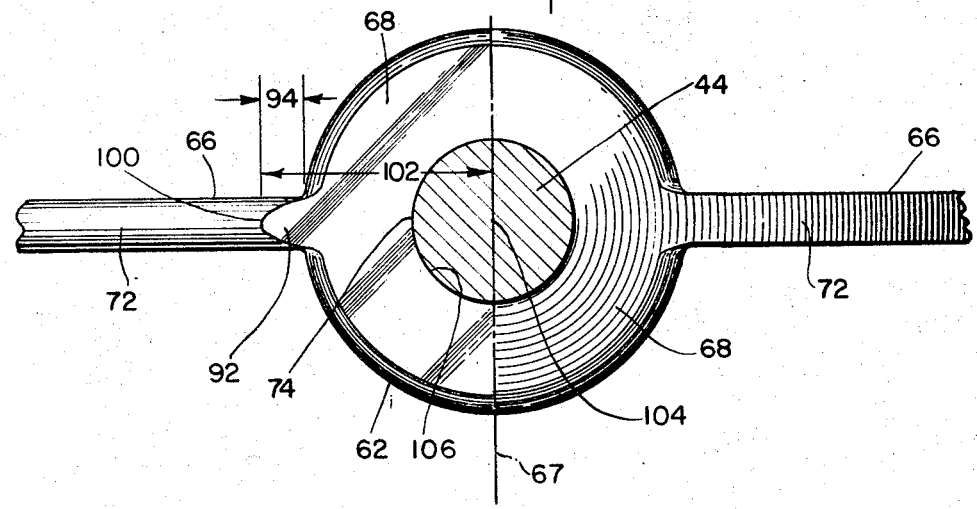
FIGURE 4 is a top plan view of the disc fragment of FIGURE 3, taken on line 4—4 of FIGURE 3.
Figure 5:
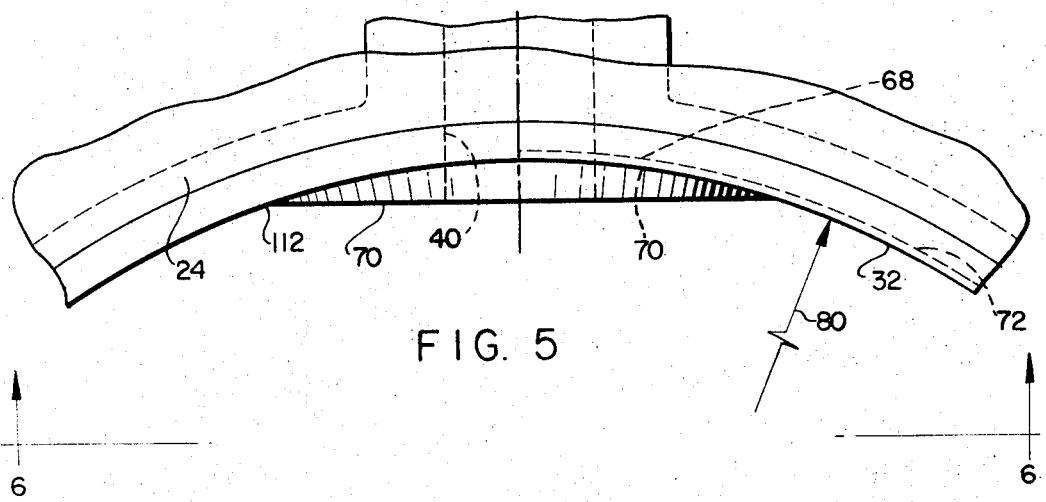
FIGURE 5 is an enlarged fragmentary side elevation view of a butterfly valve liner, showing on the left hand side of the centerline an embodiment of the invention and on the right hand side, for comparison, a theoretical construction.
Figure 6:
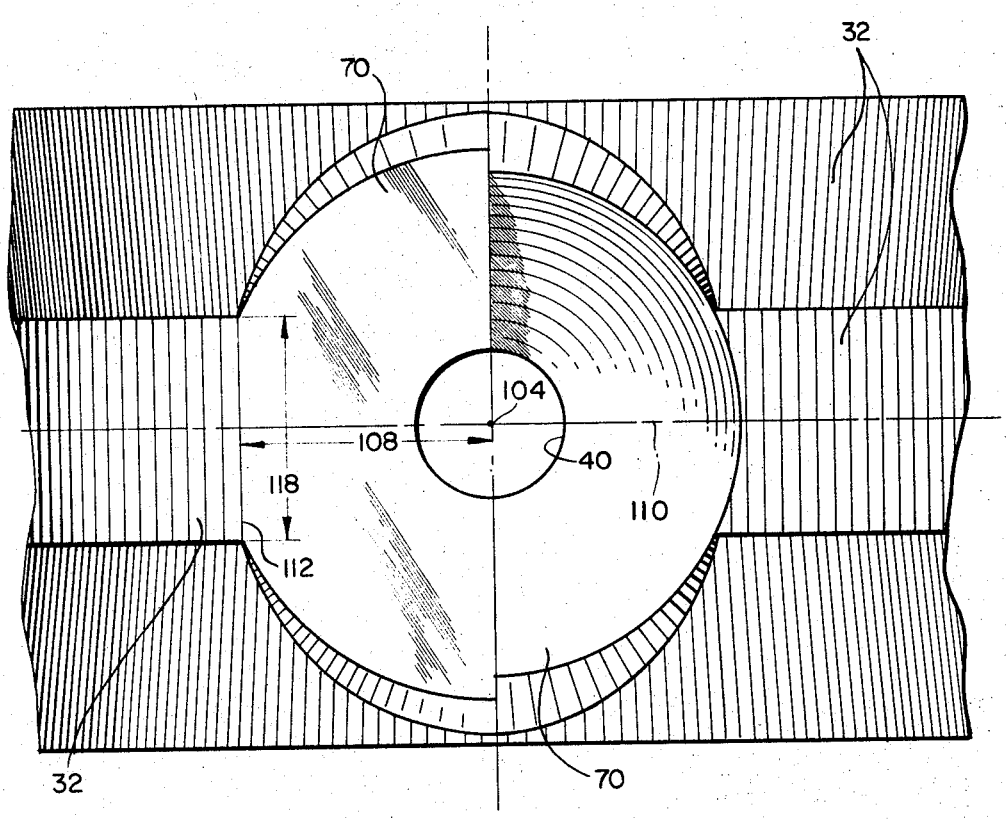
FIGURE 6 is a bottom plan view of the liner fragment of FIGURE 5, taken on line 6—6 of FIGURE 5.

FIGURES 3 and 4 illustrate on the left hand sides of a center plane 67 the novel configuration of the disc in the region where stem 44 leaves the opening in the disc hub 62, and, for the purpose of comparison, they also show on the right hand sides of the center plane the theoretically ideal but impractical construction of these parts in this region. Similarly, FIGS. 5 and 6 illustrate on their left sides the novel configuration of the liner in the same region and on their right sides the "ideal" construction.

The end of the disc hub 62 has an annular surface 68 surrounding the stem opening and presented outwardly along the stem axis 104 (see FIG. 4) toward the corresponding annular part 70 of the interior liner surface 32. This annular part surrounds the liner disc shaft opening 40 and is presented inwardly along the stem axis 104. The annular disc hub and liner surfaces 68 and 70, are necessary to provide a continuous seal from the disc wing edge 72 on one side of the stem around the stem to the disc wing edges on the other side, it being very difficult to achieve this sealing continuity by having the seal on the disc wing edge merely join the seal against the stem itself. Thus the stem surface 74 is at right angles to the disc edge surface and forms therewith a corner 76. Such a corner is notoriously difficult to fill with liner material.

On the right-hand side of the center plane 67 in FIGS. 3 and 4 the annular disc hub surface 68 and the disc edge surface 72 are both part of the spherical surface having a diameter equal to the disc diameter 78. Similarly, on the right hand side of the center plane in FIGS. 5 and 6, the annular liner surface part 70 is the section of a sphere having a diameter 80 equal to the diameter of the rest of the liner.

By making the liner diameter 80 slightly smaller than the disc diameter 78, there will be, on the right hand sides of the center plane, when the valve is assembled and in open position, a permanent compression of the resilient liner material across the annular spherical surfaces 68 and 70 of the disc hub and liner, and as the disc is rotated to closed position the amount of liner compression which is thereby produced along the narrow disc wing edge 72 will be the same as the permanent compression over these annular surfaces. Furthermore, the transition from this permanent compression (over the annular surfaces) to the closure compression (along the disc wing edge) is completely smooth and without angles or corners. This is illustrated on the right hand side of FIG. 5 by the comparison of the line 32–70 which shows the uncompressed liner shape along the seating and the dot-dash line 68–72 which represents the outline of the disc in closed position.

The form of the invention shown on the left hand sides of FIGS. 3–6 is actually an improvement over the theoretically ideal construction on the right hand sides. Thus, while the resilient liner can be easily molded with a spherical annular surface, as on the right hand side of FIGS. 5 and 6, it is very difficult, and therefore expensive, to accurately machine a spherical surface on such a metal disc in volume production. In addition, the right hand construction of FIGS. 3 and 4 results in a relatively sharp juncture 83 of the spherical surface on the disc wing edge 72 and the flat disc wing sides 84. The curvature of the spherical edge surface 72 is so slight that there is no chamfer to speak of at this edge 83. Such a sharp edge tends to cut the liner material as it moves with respect to it.

The inventive arrangement of the left hand sides of FIGS. 3–6 avoids the necessity of machining a spherical disc surface and at the same time enables the inexpensive provision of a substantial chamfer 96 between the disc wing edge and disc wing sides. Although the transition from permanent compression of the liner's annular surface parts to the "closed" compression of the liner edges is not as smooth as in the ideal right hand arrangement, the construction is such that, surprisingly, there is no leakage at this transition, and the desirable substantial chamfer 96 between the disc wing edge 72 and sides 84 can be accomplished with relatively inexpensive machining operations.

More specifically, the annular disc hub surface 68 is, on the left hand sides of FIGS. 3–6, a flat surface sufficiently close to the disc center 88 (spaced therefrom a distance 90) to cut somewhat into the disc wings 66 and provide short and narrow flattened areas 92 thereon. The smaller the distance 90 the greater the length 94 of the areas 92, the objective being to have these lengths 94 great enough so that a chamfering tool, which cuts the chamfer 96 on the disc wing edge 72 does not cut into the annular surface 68, or at least does not cut into this surface deeply enough to interfere with the sealing therealong. The line 98 shows the inner limit of this chamfer cut and how it avoids cutting into the annular surface 68. The junctures or shoulders 100 define the intersections between the curved disc wing edge 72 and the flat disc wing areas 92, and these shoulders are spaced a distance 102 from the common axis 104 of the disc stem 44 and disc stem passage 106.

In FIGS. 5 and 6, the liner on the left hand side is provided with a corresponding flat annular surface 70 having a width 108 (measured in a plane 110 which includes the axis 104 and which is at right angles to the valve flow passageway) greater than the distance 102 on the disc, so that when the disc is in closed position the shoulder 100 bears against the flat annular liner surface 70, and the narrower, curved and chamfered disc wing edge 72 extends across the corner 112 between the flat annular liner surface part 70 and the cylindrical part of the liner surface 32. Preferably the annular liner surface 70 is sufficiently extensive to cause the corner to be in the form of a crease of substantial length 118.

Figure 7A:
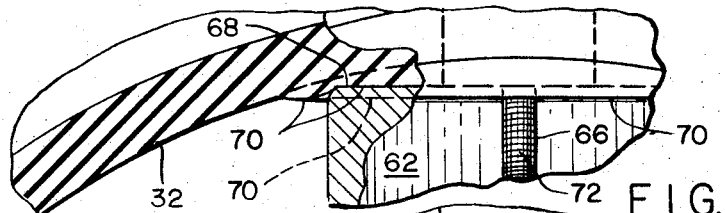
FIGURE 7A is a partially sectioned fragmentary side elevation view of the disc and liner of FIGS. 3 to 6 (left hand sides) combined as they would be in a valve, when the disc is in wide open position.
Figure 7B:
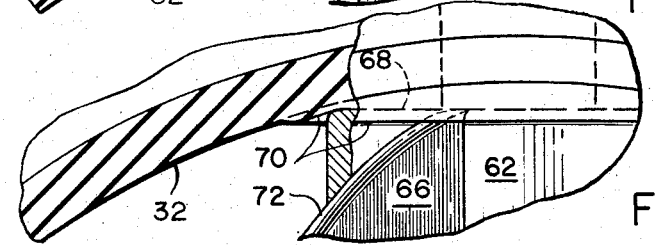
FIGURE 7B is a view like FIGURE 7A but showing the disc partially closed.
Figure 7C:
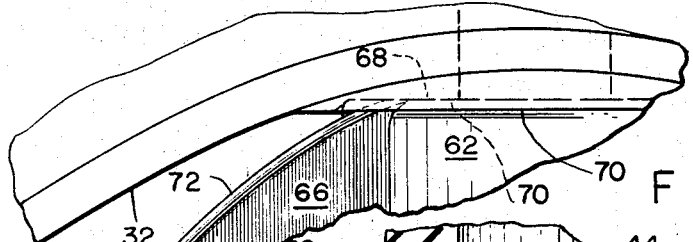
FIGURE 7C is a view like FIGURES 7A and 7B, but not cross-sectioned and showing the disc still further closed.
Figure 7D:
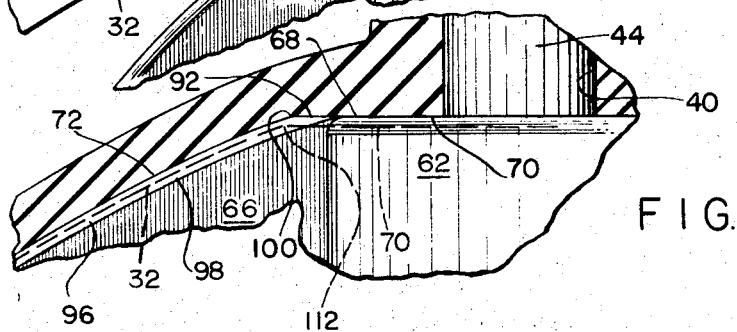
FIGURE 7D is a view like FIGURES 7A and 7B showing the disc fully closed.
Figure 8:
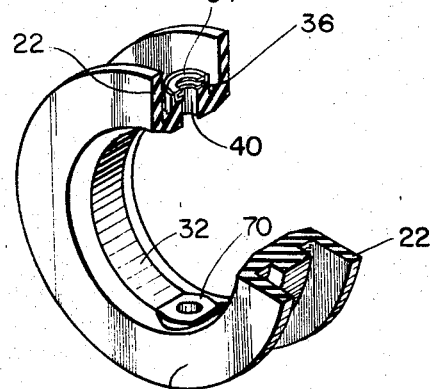
FIGURE 8 is a sectioned perspective view of the liner of FIGURES 1 and 2.
Figure 9:
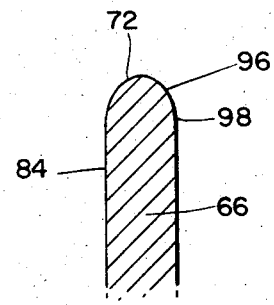
FIGURE 9 is a cross-sectioned view of the disc wing configuration taken on line 9—9 of FIGURE 3.

FIGURES 7A, 7B, 7C, and 7D are fragmentary cross-sectioned side elevation views showing the disc and liner arrangements on the left hand sides of FIGS. 3–6 in various positions relative to each other between open and closed positions, the particular object being to show the deformation of the resilient liner material. Thus, FIG. 7A shows the disc turned to wide open position with the annular hub surface 68 penetrating somewhat into the more extensive liner surface 70. FIGS. 7B and 7C show the disc 60 rotated progressively further toward closed position, the effect on the liner deformation being about the same as in FIG. 7A. In FIG. 7D, the disc is shown in fully closed position. The dashed line 32–70 again shows the uncompressed profile of the liner seating surface. The difference between this dashed line and the solid line 68–72 indicates the amount of liner squeeze in the closed position of the valve.

What I claim and desire to secure by Letters Patent is:

1. A lined butterfly valve comprising:
   (I) a body which:
      (A) is formed of a rigid material,
      (B) has an interior wall surface,
      (C) has an exterior wall surface spaced from said interior wall surface,
      (D) has an interior cavity which:
         (1) is defined by said interior wall surface,
      (E) has a stem opening which:
         (1) extends between said wall surfaces,
         (2) communicates with said interior cavity,
         (3) has an axis,
   (II) a liner which:
      (A) is formed of resilient material,
      (B) has an outer surface which:
         (1) engages said body interior surface,
         (2) covers said body interior surface,
      (C) has an inner surface which:
         (1) is spaced inwardly with respect to said outer liner surface,
         (2) forms a generally cylindrical flow passage,
         (3) has a seating region which:
            (a) is generally defined by intersection of said liner inner surface and a first plane which:
               (i) includes said stem opening axis,
               (ii) lies across said flow passage,
            (b) has first portions which:
               (i) are remote from said stem opening axis,
               (ii) follow a curve,
            (c) has second portions which:
               (i) are located at said stem opening axis,
               (ii) join said first liner portions to form corners which:
                  (o) are on opposite sides of said stem opening axis,
                  (oo) are each spaced a selected distance from said stem opening axis,
   (III) a disc which:
      (A) is formed of rigid material,
      (B) is located in said flow passage,
      (C) has a thickness substantially less than the width of said flow passage measured at right angles to said stem opening axis,
      (D) has an edge which:
         (1) lies in a second plane including said stem opening axis,
         (2) has first portions which:
            (a) are remote from said stem opening axis,
            (b) are curved to correspond to the first portions of the liner seating region,
         (3) has second portions which:
            (a) are located at said stem opening axis,
            (b) are shaped to correspond to the second portions of said liner seating region,
            (c) join said first disc edge portions to form shoulders which, when said disc is in a closed position:
               (i) are on opposite sides of said stem opening axis,
               (ii) are spaced from said stem opening axis a distance which is not greater than said selected distance,
   (IV) a stem which:
      (A) is located in said stem opening,
      (B) is connected to said disc,
   (V) means for rotating said disc about said stem opening axis with respect to said body and liner.

2. A lined butterfly valve according to claim 1, wherein said curved first portions of the intersection of said liner inner surface and said first plane are sections of a first circle which is in said first plane and which has its center on said stem opening axis.

3. A lined butterfly valve according to claim 2, wherein said curved first portions of said disc edge are sections of a second circle which is in said second plane and which has its center coinciding with the center of said first circle.

4. A lined butterfly valve according to claim 3 in which the diameter of said second circle is slightly larger than the diameter of said first circle.

5. A lined butterfly valve according to claim 4, wherein said second portion of said liner seating region, when undeformed by said disc, lies in a third plane which is perpendicular to the stem opening axis and which is spaced from the center of said first circle a distance less than said first circle diameter.

6. A lined butterfly valve according to claim 5, wherein said second disc edge portion lies in a fourth plane which is perpendicular to the stem opening axis and wherein said second disc edge portion deforms the resilient material of the second portion of said liner seating region.

7. A lined butterfly valve according to claim 6, wherein said liner corners are spaced a greater distance from said stem opening axis than said disc shoulders.

8. A lined butterfly valve according the claim 7, wherein said second disc edge portion comprises an annular surface area surrounding said stem opening axis.

9. A lined butterfly valve according to claim 8, wherein said second disc edge portion comprises a pair of short narrow areas which extend radially outwardly from said annular surface area on opposite sides of said stem opening axis.

10. A lined butterfly valve according to claim 9, wherein said disc comprises a hub surrounding said stem opening axis and a pair of flat wings which are substantially thinner than said hub, which extend from opposite sides thereof, and which include said second plane, wherein said annular surface area of said second disc edge portion is defined by the junction of said hub and said fourth plane, and wherein said short narrow areas of said second disc edge portion are defined by the junction of said flat wings and said fourth plane.

11. A lined butterfly valve according to claim 10, wherein said short narrow areas of said second disc edge portion have inner ends joined to said annular surface area at a certain radial distance from the center of said second circle which is substantially less than the diameter of said second circle.

12. A lined butterfly valve according to claim 11, wherein said first curved portions of disc edge are located on the edges of said disc wings, wherein said wing edges have chamfered surfaces and wherein the boundaries of said short narrow areas of said second disc edge portion are defined by the intersection of said chamfered surfaces and said fourth plane.

13. A lined butterfly valve according to claim 10, wherein said hub has side portions in the region of said junction with said fourth plane and wherein said sides at said junction define the outer edges of said annular surface area and form with said fourth plane an angle which is everywhere substantially greater than 90°.

14. A lined butterfly valve according to claim 7, wherein said liner corners form parts of a pair of creases extending on either side of the seating region parallel to the flow passage.

References Cited
UNITED STATES PATENTS

| | | | |
|---|---|---|---|
| 2,884,224 | 4/1959 | Fawkes | 251—306 |
| 2,923,524 | 2/1960 | Fawkes | 251—306 |
| 3,100,500 | 8/1963 | Stillwagon | 137—375 |
| 3,118,465 | 1/1964 | Scaramucci | 137—454.2 |

M. CARY NELSON, *Primary Examiner.*

H. KLINKSIEK, *Assistant Examiner.*